United States Patent Office 3,216,143
Patented Nov. 9, 1965

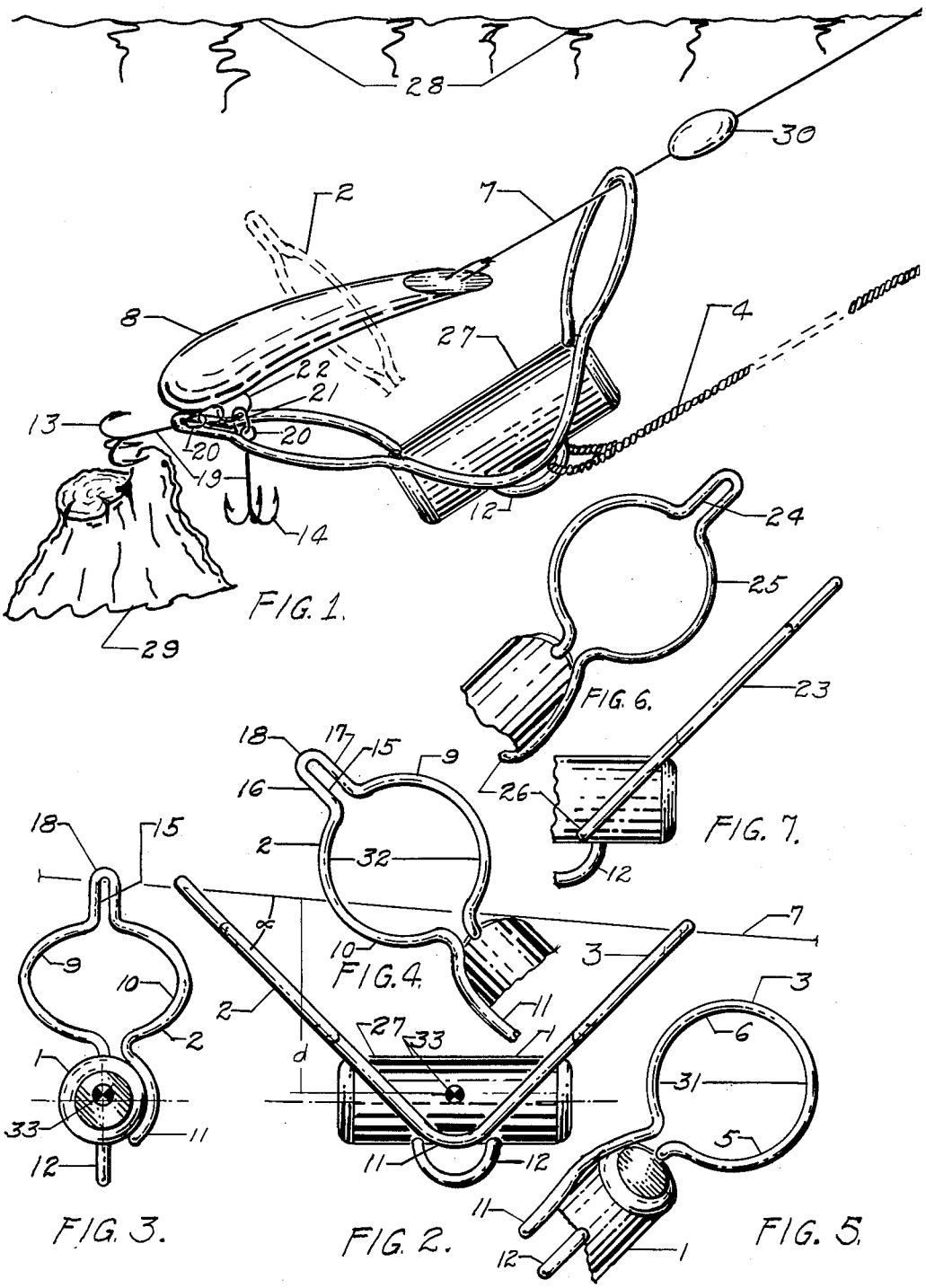

3,216,143
FISHING LURE RETRIEVERS
George E. Seldon, 534 N. Holmes Ave., Kirkwood, Mo.
Filed Nov. 23, 1962, Ser. No. 239,421
3 Claims. (Cl. 43—17.2)

The primary object of this invention is to provide a device for retrieving a fishing lure that has become snagged on a submerged object that is inaccessible to the fisherman, and so securely snagged that bumping a weight against the hook will not dislodge it. This device on reaching the snagged hook may not only be used to bump the snagged hook but on pulling the strong retriever cord the retriever catches the fouled hook or lure and a sufficient tug on the cord will bend or break the hook or the hooked object so that the hook and lure are released. If required the hook may then be reshaped.

Another object is to provide a lure retriever that can be easily carried in a tackle box and when required readily be attached over the line of the lure (without the necessity of removing the line from the reel and pole) which line then guides the retriever unerringly to the snagged lure.

A further object is to provide a lure retriever that can be used purely as a bumper or inertial device to separate the lure from its snagging object.

It is another object to provide a lure retriever with two widely separated guides or shoes to control the attitude of the retriever so as to position its catching device on the leading guide to make possible positive attachment to the snagged hook immediately on contact. This eliminates hit and miss and try, try again methods required heretofore.

A further object is to provide a lure retriever that will pass over the lure proper, select the snagged hook and catch it and permit pulling it away from the snag while not damaging the lure.

An object of the widely separated guides is to insure the free movement of the retriever along the lure's fishing line without tangling in it and thus preventing altogether the possibility of repossessing the lure.

FIGURE 1 shows the retriever in use with its catch caught on the tang below the eye of the hook. It also shows the looped bail of the retriever passing over the lure.

FIGURE 2 shows the side of the retriever with the dihedral angle between bails and the connected bails forming a hook.

FIGURE 3 is a front end view of FIGURE 2 showing the free ends of the bails adjacent to the weight and forming a double hook past which the snagged line is threaded. It also shows the position of the center of gravity.

FIGURE 4 is a view at right angles to FIGURE 2 showing the true shape of the snagging loop which leads the retriever on its trip to the lure.

FIGURE 5 is a view showing the true shape of the trailing bail 3.

FIGURE 6 is a true view of an optional right side loop to make the retriever ambidextrous.

FIGURE 7 is a view at right angles to FIG. 6 with bail 23 replacing bail 3 of FIG. 2 in the retriever.

Description

The retriever assembly 27 shown in FIGURE 2 consists of a weight 1 having two wire bails 2 and 3 respectively. These bails extend preferably from the ends of a cylindrical weight at an angle less than 180° or a dihedral angle. This angle makes a long stable base of two widely separated points contacting the fishing line. The weight 1 consists of a body having appreciable weight which serves to maintain the correct attitude of the retriever as gravity moves it down the fishing line 7 toward the lure 8. The weight 1 can be made in almost any shape but a cylinder is preferred as this makes the contact base on the line longer and more stable. Any metal may be used but lead is preferred because of its low cost and high density. It is preferably encased in a rustless casing. Further lead can be poured around the anchor legs 5 and 9 to anchor them securely in the retriever assembly. Lead also establishes the center of gravity 33 of the retriever very close to the center of the cylinder, making the moment of the weight a maximum. This stabilizes the weight in a position always directly below the fishing line. An eye 12 serves as a place to tie a heavy retrieving cord 4. Both bails 2 and 3 are substantially symmetrical about a centerline beyond the weight 1 as shown in FIGS. 4 and 5. Bail 3 is shown in true proportions in FIG. 5 and the loop 31 is a circle and is divisible at the centerline into two very similar legs 5 and 6. Leg 5 is solidly embedded in the weight and serves to anchor the bail 3 in the assembly. Leg 6 is similar to anchor leg 5 except it is not anchored in the weight but passes along the side of the weight 1 which it may or may not touch, as shown in FIG. 5. If leg 6 is pressed against the weight 1 with some preload (preferred), it may be snapped or sprung away from the weight in order to insert the line 7 of the snagged lure 8. Leg 9 is the anchor leg of loop 2 and leg 10 is the sprung leg which also preferably touches the weight 1, FIG. 3. The legs 6 and 10 are preferably continuous being joined substantially at the center of arc 11 which then becomes the entering lip of a double hook consisting of the legs 6 and 5 and 10 and 9. Such joinder makes the bail assembly stronger especially for retrieving loads and for insuring that once the lure's fishing line is placed inside a loop the line can not be accidentally knocked out, especially in the sloshing manoeuvre. The bail 2 is similar to bail 3 in having a circular loop 32, similar to loop 31. The diameter of the circular loops 31 and 32 on bails 2 and 3 is of sufficient size that the bails pass over the lure 8 and its hooks 13 and 14. If bail 2 has a loop that passes over the lure 8 there is usually room between it, the leading bail and the trailing bail 3 for a full sized lure. Bail 2 differs from bail 3 however in that it has a radial slot 15 formed by the straight wire pieces 16 and 17 of the bail wire 2 bent parallel on itself. The radial slot 15 is closed at its outer end by the return bend 18. This slot opens radially into the circular portion of bail 2 pointed toward the eye and becomes a "catch" when the retriever is pulled back by the cord 4 in the direction of the opposite bail 3 as shown. In FIG. 2 slot 15 has the same direction as the bail 2, thus it is canted at an angle α with respect to the fishing line 7 it rides. This is similar to the angle of attack of an airfoil with respect to the oncoming air, and it becomes a ramp to slide along the lure which is then received in the sliding loop. The slot 15 is wide enough to admit the wire of shank 19 of the hooks 13 and 14 and the wire of the link 21 and the lure eye 22 but it will not admit or pass the larger formed diameters of the links and eyes. That is, the slot 15 will hold the eye 20 of the hook or link 21 or eye 22 if the large formed diameter is presented crosswise of the slot, and this crosswise presentation must occur after the passage of one of the above links since each succeeding link is turned 90° with respect to its connecting link.

Bail 23 is shown in FIGURE 7, and in some instances replaces bail 3 (right side of FIG. 2). Bail 23 is like bail 2 of FIG. 2 in that it also has a catching slot 24, FIGURE 6, similar to slot 15 of bail 2. When bail 23 replaces bail 3 in assembly 27 the retriever becomes ambidextrous and the bail on either end may be used as the leading bail. However bail 23 is shown with a leg 25 terminated at 26 just beyond the point at which it contacts the weight 1.

That is the leg 25 and leg 10 are not connected here, and is simply another way of making the retriever and is not a requirement for an ambidextrous retriever. Thus the ambidextrous retriever may be connected as shown at 11 or open as in FIGURES 6 and 7. The open construction has some advantages, and the connected construction for any given wire diameter is definitely stronger and is preferred. The retriever may be made with a catching slot at one end only or have catching slots at both ends and either may have the free legs joined or separately sprung.

*Operation*

In operation when lure 8 gets snagged on an object 29 below the water surface 28, the free end of the heavy retriever cord is attached to the boat or fisherman while the opposite end of this cord 4 is firmly attached to the retriever at the eye 12. The retriever 27 is then hung over the fishing line 7 by slipping it under the lip formed by arc 11 of the double hook or the free ends 26. On paying out the heavy cord 4 the retriever under the pull of gravity slides down the fishing line with the bails acting as shoes and guides. The loops in the bails are large so that they easily pass over the sinker 30 and the lure 8 with its hooks. The retriever may be helped along by keeping the line taut and swishing it about, and from side to side etc. The retriever guided by the encircling bails follows the line until it reaches the snagged object beyond which it is unable to go. Side to side and back and forth sloshing of the line 7 while holding it taut and the resultant momentum of the heavy retriever may loosen the hook. But if not, then while holding the fishing line 7 taut, the heavy cord 4 is withdrawn slowly at first and if it immediately meets resistance it most likely has caught the shank of the snagged hook in the catching slot. If any other hooks are also in the loop but not snagged they will be pushed aside since there is no reaction holding the hook stationary. If the snagged hook is not caught on the first try the retriever is free and the fisherman knows by the light pull on the cord that no "locking on" contact has been made with the stuck lure, and the operation is repeated until the retriever "locks onto" the lure assembly. Then on pulling back the cord with sufficient force the lure breaks away from the snagging object. This breaking away is accomplished by either raising the object, breaking part of it away or breaking the hook and releasing the lure.

If the lure becomes caught on a heavy fish and the fisherman fears his line will break, it is an easy matter to send down the retriever and catch the lure with it and then the fisherman has the heavy cord in addition to his fragile line to bring in the fish.

Note also the arrangement of the retriever. The eye 12 is aligned with the respective radial slots 15 and 24 in the bails. The radial slot is placed on the circumference of the circular part of the loop diametrically opposite its attaching point on the weight and the eye 12. Any stationary object within the loop will tend to get caught in the slot as the bail is pulled away. If thin enough such as the hook shank 19 or the thin side of the link 21 or eye 22 the object will go into the slot and since the next link will not normally pass through the slot the hook or object becomes hung up on the wire of the catch of the retriever. The retriever is now "locked onto" the hook, link or eye and the lure can be retrieved by pulling back the heavy cord of the retriever.

In use the retriever moves down the fishing line toward the snagged hook by the force of gravity alone. If the fishing line sags the retriever finds and stops at lowest point in the sag. If the base of the retriever is short the tendency here to twist the fishing line into a rope is very great. The shorter the base the greater the tendency to rope. Once roping occurs retrieving stops until the roping is undone, this is usually most impractical. On winding a fishing line onto a reel initially and in use, especially with propeller and other turning types of lures it is substantially impossible to keep it free of twists and turns about its longitudinal axis. Then on casts with the line lying free it tends to untwist and uncoil, causing roping if the line doubles upon itself or loops.

A large angle $\alpha$ also provides a long lever arm for the weight to fall and remain always below the line, particularly in the sloshing maneuvers. Here if the weight rotates about the fishing line, the line and the retrieving cord twist upon each other forming a rope. This effectively prevents travel of the retrieving device toward the lure. Retrieving then becomes impossible.

I claim:

1. In a device for retrieving a submerged and snagged fishing lure with attached hooks, line and sinker, said hooks being suspended from the bottom of the lure, and at least one of which hooks is snagged on a heavy sunken object; weight means; two rigid, such as stiff wire, bail-like means extending upwardly from said weight means at a dihedral angle to each other; on each bail-like means a circular loop of sufficient diameter to encompass the lure and its hooks, means whereby said bail-like means may be hooked over and around said attached line and permits the retrieving device to move along said line only and causes said bail-like means to become guides for conducting the device along the line to and over the submerged and snagged lure; one of said bail-like means ahead of and leading the remaining rearward bail-like means in a downward trip, said one bail-like means also extending forwardly from said weight means, means on said device for attaching a cord; a heavy retrieving cord attached to said device whereby the retrieving device is lowered along the line down to and over the snagged lure where the retrieving device comes to rest on the sunken object; on the leading bail-means, U shaped catching means opening into the top of the circular loop thereof and the closed opposite end extending radially and upwardly from said loop, said U shaped means adapted to catch the shank of the snagged hook and when the heavy retrieving cord is drawn back with sufficient force the catching means on the bail means engages the snagged hook and breaks the hook's hold on the sunken object and retrieves the hook with the attached lure and sinker.

2. In a device for retrieving a snagged fishing lure with attached line and hooks suspended from the bottom of the lure and one at least of said hooks snagged on a submerged object, a cylindrical weight; an eye on said weight for the attachment of a retrieving cord; two stiff wire bails each generally shaped in a flat unbroken loop, one leg of each bail firmly anchored in said weight so as to form a dihedral angle with respect to the opposite bail; an upwardly and forwardly extending circular loop formed in at least one bail making this bail the leading bail, the loop being of such size as to pass a lure with its hooks therethrough, each circular loop including a return bend at the extremity of each bail where the loop forms a shoe to contact the line and on which shoe the retriever slides; the free ends of said bails joined to form a double wire hook with a common lip permitting the retriever to be hooked and mounted on the line attached to the lure; a hook catcher on the loop of the leading bail, said catcher consisting of a narrow radial slot formed by drawing the wire of the loop into the short parallel lengths, separated a distance only slightly greater than the diameter of the wire of the hook's shank, lure links and eyes, thereby admitting the narrowest profiles only of these shanks, links and eyes into the slot while refusing admission of the larger formed profiles of these same shanks, links and eyes; this radial slot located off the perimeter of the loop of the bail diametrically opposite the anchor leg and aligned with the cord eyes; a heavy retriever cord attached to said eye, whereby when the lure becomes snagged the retriever device may above the water's surface be hooked over and around the line with the leading bail toward the lure and lowered, the bail then leads the retriever along the line to the lure and the snagging object and on making contact with the lure, the loop and hook catcher of the leading bail becomes a ramp which slides over the lure and guides the lure's passage through the loop of the leading bail which bail then comes to rest on the snagging object and the loop of the bail falls around the snagged hook; on withdrawing the heavy retriever cord the shank of the snagged hook is caught in the slot of the catcher and the hold of the snagging object on the lure can be broken without serious damage to the lure and its attachments.

3. In a device for retrieving a snagged fishing lure with attached hooks, line and sinker, said hooks being suspended from the bottom of the lure, and at least one of said hooks snagged on a submerged object; a weight; a pair of wire bails extending upwardly from said weight to form a dihedral angle with each other, one of said bails being forward of the other and extending forwardly from said weight, each of said bails comprising a wire loop having two substantially symmetrical legs beyond the weight, one leg of each loop firmly embedded in and attached to said weight while the remaining leg is free and lies adjacent to and touching the weight forming a snap catch under which the line of the lure is passed causing the looped bails to encircle the line, said bails acting as shoes to guide the retriever's slide to the snagged lure, each bail wire formed into a circular loop of such diameter as to pass over the sinker and lure with its hooks; the loop of the leading bail having on the side opposite the attaching point a radial hook catching slot formed by bending the wire of the loop substantially parallel to itself for a distance, whereby said slot opens radially into the circular loop at one end and is closed at the other by the return bend of the wire; an additional wire eye securely attached to said weight on which to fasten a retrieving cord; and a strong retrieving cord tied to said eye, whereby said retrieving device gravitates down the fishing line toward the snagged lure, the wire of the leading bail forming the catching slot, also forming a ramp, guiding and facilitating the leading bail to pass over the snagged lure and finally stopping, on the snagging object, then on pulling back the retriever cord the wire of the catching slot in the leading bail engages the shank of the snagged hook and this hook and lure are then disengaged from the snagging object by pulling the retriever cord.

References Cited by the Examiner

UNITED STATES PATENTS

| | | | |
|---|---|---|---|
| 2,257,415 | 9/41 | Gerdin | 43—44.95 X |
| 2,316,500 | 4/43 | Bray | 43—17.2 |
| 2,634,539 | 4/53 | Brown et al. | 43—17.2 |
| 2,800,738 | 7/57 | Allman | 43—17.2 |
| 2,828,570 | 4/58 | Bradbury | 43—17.2 |
| 2,866,290 | 12/58 | Karry | 43—17.2 |
| 3,039,223 | 6/62 | Pavek | 43—17.2 |

SAMUEL KOREN, *Primary Examiner.*